United States Patent
Booth et al.

(10) Patent No.: US 12,311,741 B2
(45) Date of Patent: May 27, 2025

(54) VEHICLE WITH DEBRIS SHIELD

(71) Applicant: CNH Industrial America LLC, New Holland, PA (US)

(72) Inventors: David Booth, New Holland, PA (US); Michael Braun, New Holland, PA (US); Aaron Onken, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 338 days.

(21) Appl. No.: 17/948,826

(22) Filed: Sep. 20, 2022

(65) Prior Publication Data

US 2024/0092155 A1 Mar. 21, 2024

(51) Int. Cl.
*B60J 11/06* (2006.01)
*B60R 19/52* (2006.01)

(52) U.S. Cl.
CPC ............... *B60J 11/06* (2013.01); *B60R 19/52* (2013.01)

(58) Field of Classification Search
CPC ..... B60J 11/06; B60R 19/52; B60R 2019/525
See application file for complete search history.

(56) References Cited

U.S. PATENT DOCUMENTS

| 6,019,161 A | * | 2/2000 | Travis | B60K 11/08 165/41 |
| 2004/0251066 A1 | * | 12/2004 | White | B60R 19/52 180/68.6 |
| 2005/0029028 A1 | * | 2/2005 | Steinmacher | B60R 19/52 180/68.6 |
| 2006/0118281 A1 | * | 6/2006 | Radke | B60K 11/08 165/119 |
| 2006/0213708 A1 | * | 9/2006 | Witwer | F01P 11/10 180/68.1 |
| 2014/0151139 A1 | * | 6/2014 | Rizzon | B60K 11/08 180/68.1 |
| 2015/0069744 A1 | * | 3/2015 | Robinson, Jr. | B60J 11/06 280/770 |
| 2017/0008387 A1 | * | 1/2017 | Vincze | B60K 11/08 |
| 2017/0274853 A1 | * | 9/2017 | Hasegawa | B60K 11/04 |
| 2023/0304642 A1 | * | 9/2023 | Sato | F21S 43/14 |

* cited by examiner

Primary Examiner — Brian L Swenson
(74) Attorney, Agent, or Firm — Rickard K. DeMille; Rebecca L. Henkel; Peter K. Zacharias (57) ABSTRACT

A vehicle includes a frame, a tractive element coupled to the frame, an engine coupled to the frame and configured to drive the tractive element, and a debris shield coupled to the frame. The debris shield at least partially defines at least one of a left side or a right side of an engine compartment containing the engine. The debris shield includes an outer frame coupled to the frame and defining a ventilation aperture, an inner frame coupled to the outer frame, and a screen extending across the ventilation aperture. The screen extends between the outer frame and the inner frame such that the inner frame limits movement of the screen relative to the outer frame.

18 Claims, 9 Drawing Sheets

VEHICLE WITH DEBRIS SHIELD

BACKGROUND

The present disclosure relates generally to vehicles. More specifically, the present disclosure relates to agricultural vehicles that regularly encounter debris, such as leaves, stalks, or chaff (e.g., corn or soybean husks, haw, straw, etc.). Such debris can build up around an engine during operation. If the debris enters an engine compartment, it can be heated by the engine.

SUMMARY

One embodiment relates to a vehicle. The vehicle includes a frame, a tractive element coupled to the frame, an engine coupled to the frame and configured to drive the tractive element, and a debris shield coupled to the frame. The debris shield at least partially defines at least one of a left side or a right side of an engine compartment containing the engine. The debris shield includes an outer frame coupled to the frame and defining a ventilation aperture, an inner frame coupled to the outer frame, and a screen extending across the ventilation aperture. The screen extends between the outer frame and the inner frame such that the inner frame limits movement of the screen relative to the outer frame.

Another embodiment relates to a vehicle. The vehicle includes a frame, a tractive element coupled to the frame, an engine coupled to the frame and configured to drive the tractive element, and a debris shield coupled to the frame. The debris shield at least partially defines at least one of a left side or a right side of an engine compartment containing the engine. The debris shield includes an outer frame coupled to the frame and defining a first ventilation aperture and a second ventilation aperture, an inner frame coupled to the outer frame, and a screen coupled to the outer frame and extending across the first ventilation aperture and the second ventilation aperture. The inner frame includes a baffle extending between the first ventilation aperture and the second ventilation aperture Another embodiment relates to a debris shield for an engine compartment of a vehicle. The debris shield includes an outer frame defining a first ventilation aperture, a second ventilation aperture, a third ventilation aperture, and a pass-through aperture configured to receive a conduit therethrough. The second ventilation aperture is positioned between the first ventilation aperture and the third ventilation aperture. The pass-through aperture is positioned between the second ventilation aperture and the third ventilation aperture. The debris shield includes an inner frame coupled to the outer frame. The inner frame includes a first baffle extending between the first ventilation aperture and the second ventilation aperture and a second baffle extending away from the outer frame and at least partially across the first ventilation aperture. The debris shield includes a screen extending across the first ventilation aperture. The screen extends between the outer frame and the inner frame such that the inner frame limits movement of the screen relative to the outer frame. The inner frame surrounds the first ventilation aperture, the second ventilation aperture, and the third ventilation aperture.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes an engine compartment containing an engine. In order to reduce or maintain the temperature of the engine, the vehicle may vent heated air from the engine compartment through a series of ventilation apertures. However, the engine compartment comes into frequent contact with debris that could potentially enter the engine compartment through the ventilation apertures. To prevent this, the vehicle includes a pair of debris shields positioned on the left and right sides of the engine compartment, respectively. Each debris shield includes an outer frame that defines a series of ventilation apertures that permit heated air from exiting the engine compartment. One or more screens extend across the ventilation apertures, preventing debris from entering the engine compartment through the ventilation apertures. To hold the screens in place, an inner frame is coupled to the outer frame and applies a clamping force on the screens. The inner frame further includes a series of baffles having angled surfaces. The angled surfaces redirect heated air from the engine compartment toward the ventilation apertures, further increasing the rate at which heated air can exit the engine compartment.

Overall Vehicle

Figure 1:
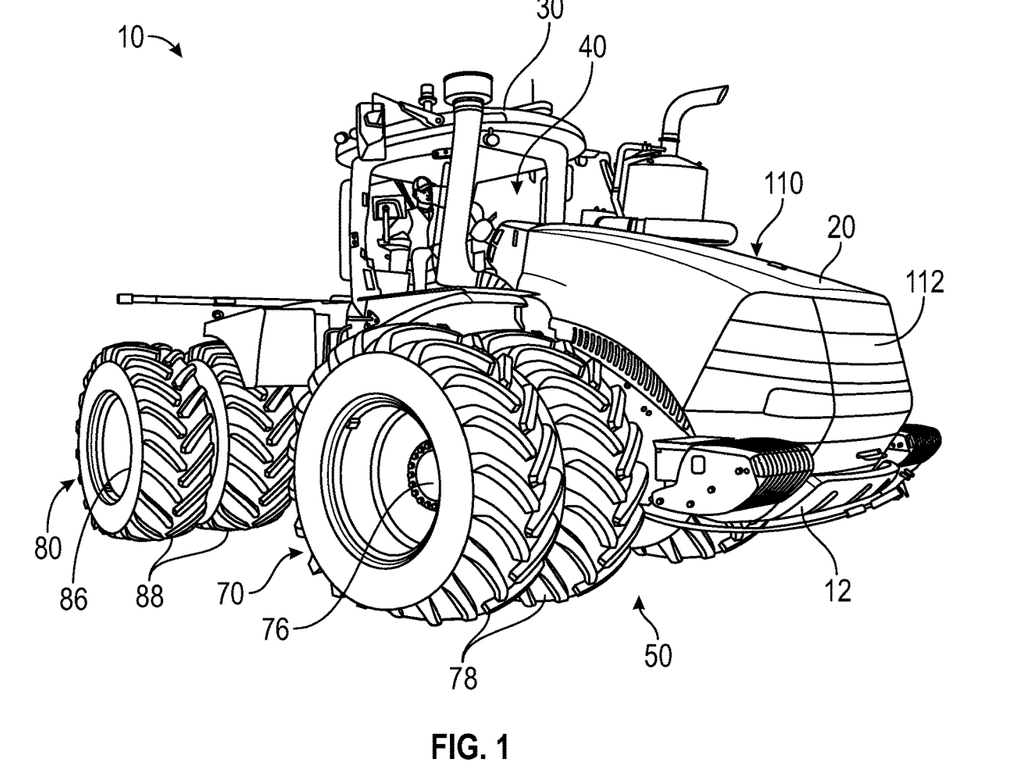
FIG. 1 is a perspective view of a vehicle, according to an exemplary embodiment.
Figure 2:
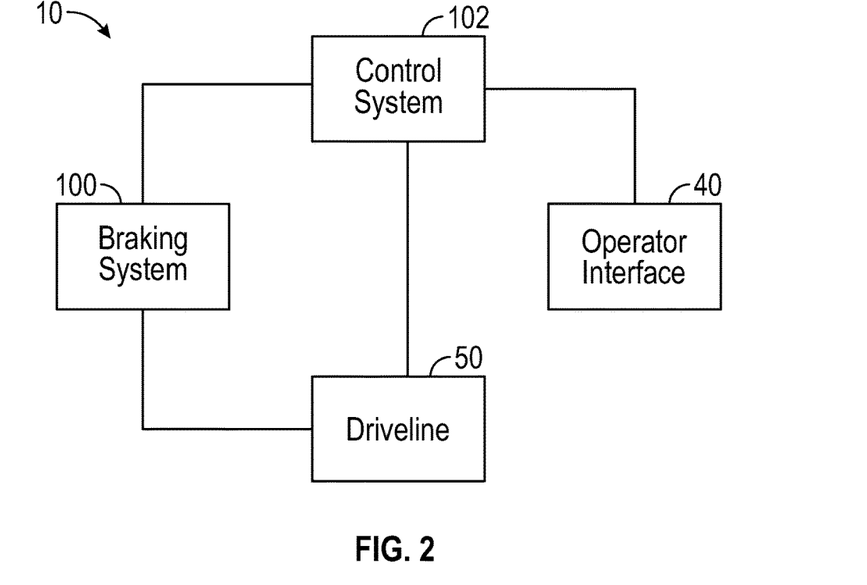
FIG. 2 is a schematic block diagram of the vehicle of FIG. 1, according to an exemplary embodiment.
Figure 3:
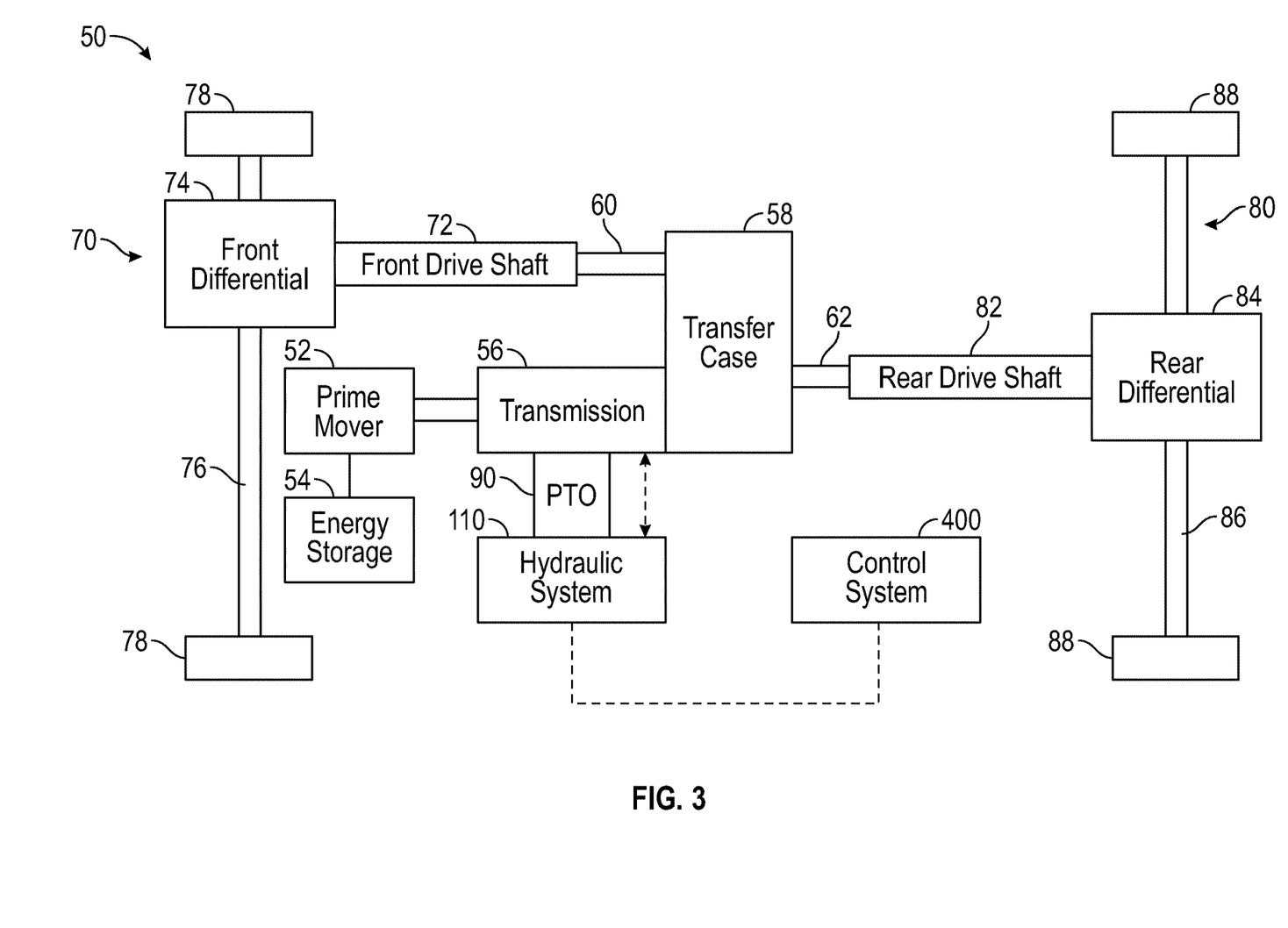
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 102, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first set of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second set of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Figure 12:
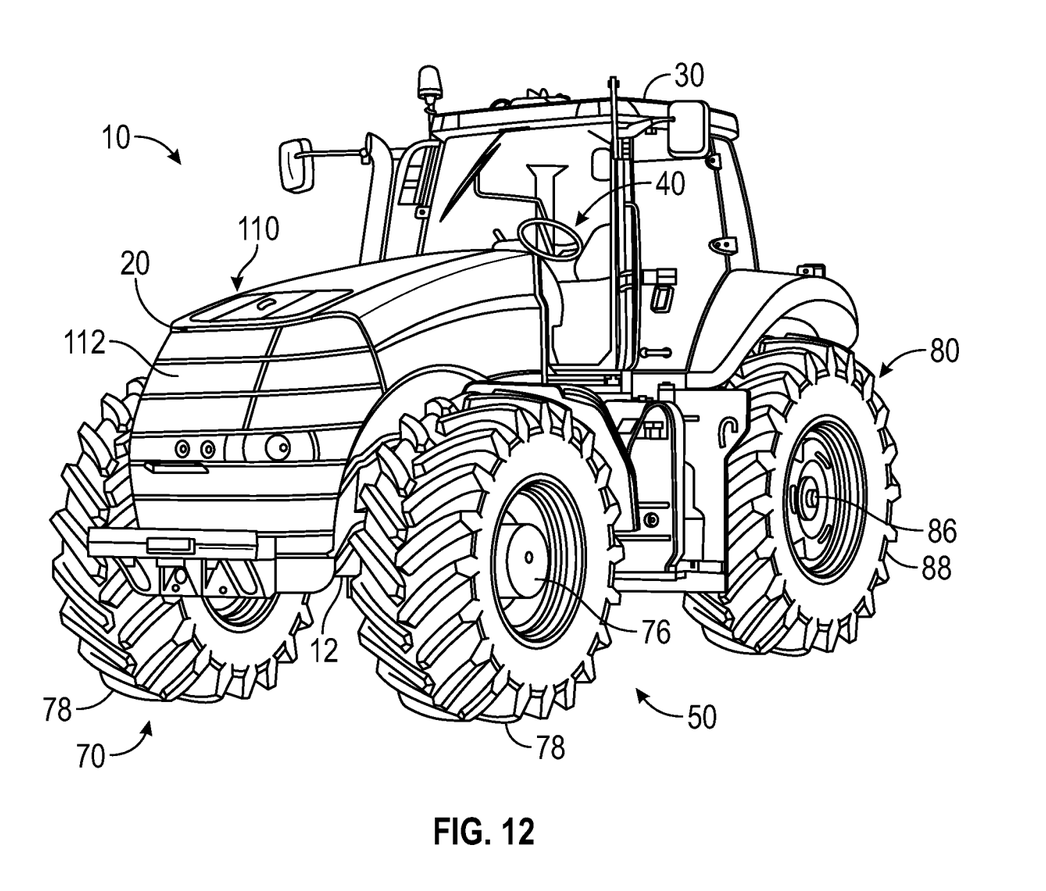
FIG. 12 is a perspective view of a vehicle, according to another exemplary embodiment.

FIG. 12 illustrates an alternative embodiment of the vehicle 10. Any description herein with respect to the vehicle of FIG. 1 may also apply to the vehicle 10 of FIG. 12, except as otherwise specified. In some embodiments, the vehicle 10 of FIG. 1 is a four-wheel-drive vehicle and the vehicle 10 of FIG. 12 is a two-wheel-drive vehicle.

Engine Compartment

Figure 4:
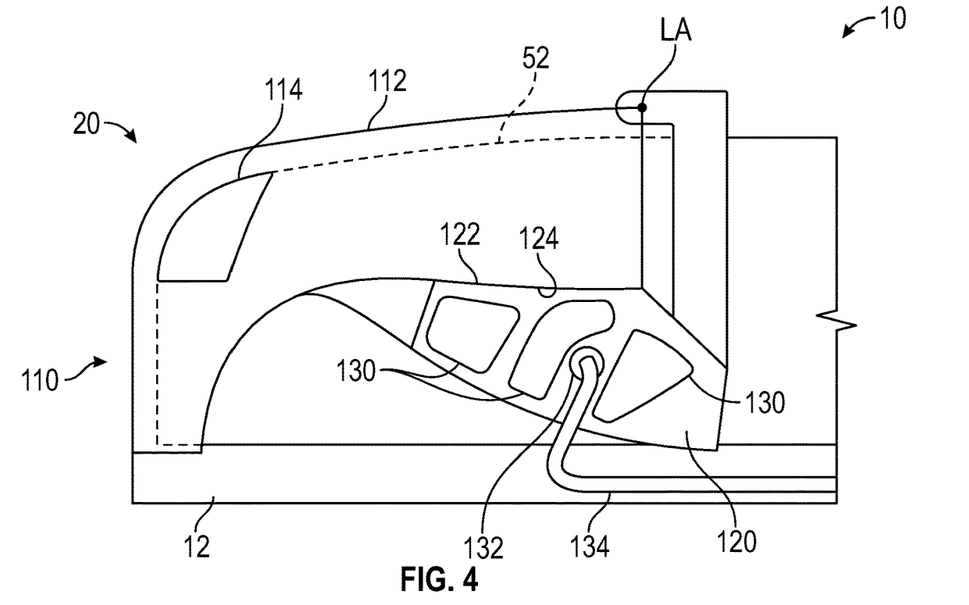
FIG. 4 is a left side view of an engine compartment of the vehicle of FIG. 1 with a hood in a closed position, according to an exemplary embodiment.
Figure 5:
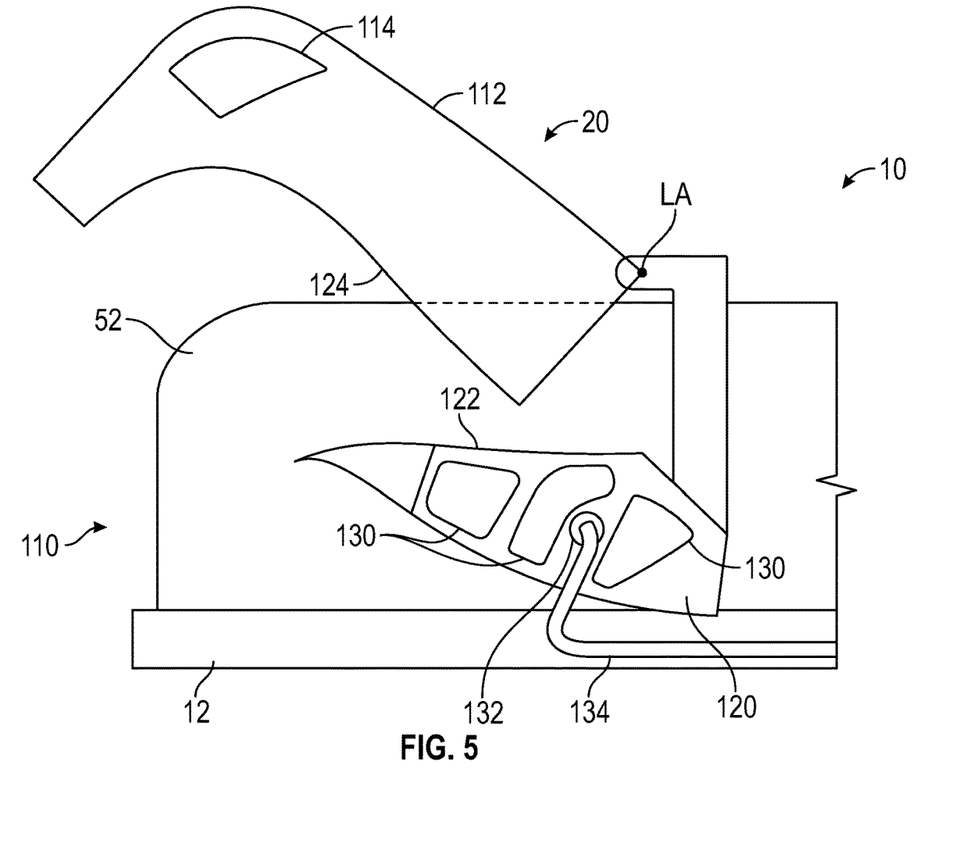
FIG. 5 is a left side view of the engine compartment of FIG. 4 with the hood in an open position.

Referring to FIGS. 4 and 5, the body 20 defines a compartment, chamber, or body section, shown as engine compartment 110, defining a volume that at least partially contains a portion of the driveline 50. As shown, the engine compartment 110 at least partially contains the prime mover 52. In an embodiment where the prime mover 52 includes an internal combustion engine, the prime mover 52 may include an engine block, fuel distribution systems, spark plugs, glow plugs, radiators, fans, alternators, pumps, reservoirs, or other components. The engine compartment 110 may protect the prime mover 52 and other components of the driveline 50 from contact with debris. The engine compartment 110 may permit ventilation that exhausts hot air from the engine compartment 110 and/or draws cool air into the engine compartment 110.

The body 20 includes a cover or shield, shown as hood 112, that at least partially defines the engine compartment 110. The hood 112 is selectively repositionable between a closed position or operating position, shown in FIG. 4, and an open position or maintenance position, shown in FIG. 5. In the closed position, the hood 112 extends along the top side, left side, right side, and front side of the prime mover 52, enclosing the prime mover 52 within the engine compartment 110. In the open position, the hood 112 moves away from the prime mover 52 to facilitate an operator accessing the engine compartment 110 (e.g., to perform maintenance or visually inspect components of the prime mover 52). The hood 112 may be pivotally or otherwise movably coupled to the frame 12 to permit repositioning the hood. As shown, the hood 112 is rotatable about a lateral axis LA that is defined by the frame 12. The hood may define one or more apertures or passages, shown as ventilation apertures 114, that fluidly couple the inner volume of the engine compartment 110 to the surrounding atmosphere. The ventilation apertures 114 may facilitate ventilation of the engine compartment.

Referring still to FIGS. 4 and 5, the body 20 further includes a pair of hood side debris shields, guards, barriers, covers, protectors, or escutcheons, shown as debris shields 120. The debris shields 120 define the engine compartment.

The debris shields 120 are coupled to the frame 12. In some embodiments, the debris shields 120 are removably coupled to the frame 12 (e.g., to facilitate cleaning the debris shields 120 or maintenance of the prime mover 52). By way of example, the debris shields 120 may be coupled to the frame 12 with one or more removable fasteners (e.g., bolts, pins, clips, etc.).

FIGS. 4 and 5 illustrate a first one of the debris shields 120 positioned along a left side of the vehicle 10 and defining a left side of the engine compartment 110. The second one of the debris shields 120 is similarly positioned along a right side of the vehicle 10 and defines a right side of the engine compartment 110. By way of example, the debris shields 120 may be symmetrically arranged about a center plane of the vehicle 10 that extends vertically and longitudinally (e.g., the plane of the page in FIG. 4, a plane that is perpendicular to a lateral axis). Accordingly, any description of the debris shield 120 shown in FIG. 4 may also apply to the debris shield 120 positioned along the right side of the vehicle 10.

Referring to FIG. 4, the debris shield 120 is positioned below the hood 112 and extends downward from the hood 112. The debris shield 120 has a top edge or boundary, shown as upper edge 122. The hood 112 has a bottom edge or boundary, shown as lower edge 124. The hood 112 and the debris shield 120 are positioned such that the debris shield 120 engages or abuts the hood 112 when the hood is in the closed position. Specifically, the upper edge 122 of the debris shield 120 engages or abuts the lower edge 124 of the hood 112. The upper edge 122 and the lower edge 124 may be correspondingly shaped to facilitate continuous engagement between the upper edge 122 and the lower edge 124 along part or all of the length of the upper edge 122. This continuous engagement may form a seal between the hood 112 and the debris shield 120, preventing debris from entering the engine compartment 110 between the hood 112 and the debris shield 120.

In some embodiments, the debris shield 120 defines one or more apertures or passages, shown as ventilation apertures 130, that fluidly couple the inner volume of the engine compartment 110 to the surrounding atmosphere through the debris shield 120. The ventilation apertures 130 may facilitate ventilation of the engine compartment 110. As shown, the debris shield 120 defines three ventilation aperture 130. In other embodiments, the debris shield 120 defines more or fewer ventilation apertures 130. As shown, the ventilation apertures 130 are spaced along a length of the debris shield 120 (e.g., along the upper edge 122).

In some embodiments, the debris shield 120 defines a one or more apertures or passages, shown as pass-through aperture 132, that fluidly couples the inner volume of the engine compartment 110 to the surrounding atmosphere through the debris shield 120. The pass-through aperture 132 permits the passage of one or more components through the debris shield 120 (e.g., from the engine compartment 110 to the exterior of the vehicle 10). As shown, a conduit 134 (e.g., a tube, a pipe, a hose, a duct, channel, etc.) passes through the pass-through aperture 132 from the prime mover 52 to the exterior of the vehicle 10. In some embodiments, the conduit 134 is a pipe or other portion of an exhaust system that directs exhaust gasses away from the prime mover 52. In other embodiments, the conduit 134 is a hydraulic hose of a hydraulic system. By way of example, the conduit 134 may direct hydraulic fluid between two components of a hydraulic system (e.g., a reservoir, a pump, an actuator, a valve, etc.). In other embodiments, the pass-through aperture 132 is omitted.

Debris Shields

Referring to FIGS. 6-9, a debris shield 200 is shown according to an exemplary embodiment. The debris shield 200 is an exemplary configuration of the debris shield 120. Accordingly, the debris shield 200 may be substantially similar to the debris shield 120 except as otherwise specified. As shown, the debris shield 200 is configured for use on the right side of the vehicle 10 (e.g., extends along the right side of the engine compartment 110, a curb side of the vehicle 10, opposite a road side of the vehicle 10, etc.).

Figure 6:
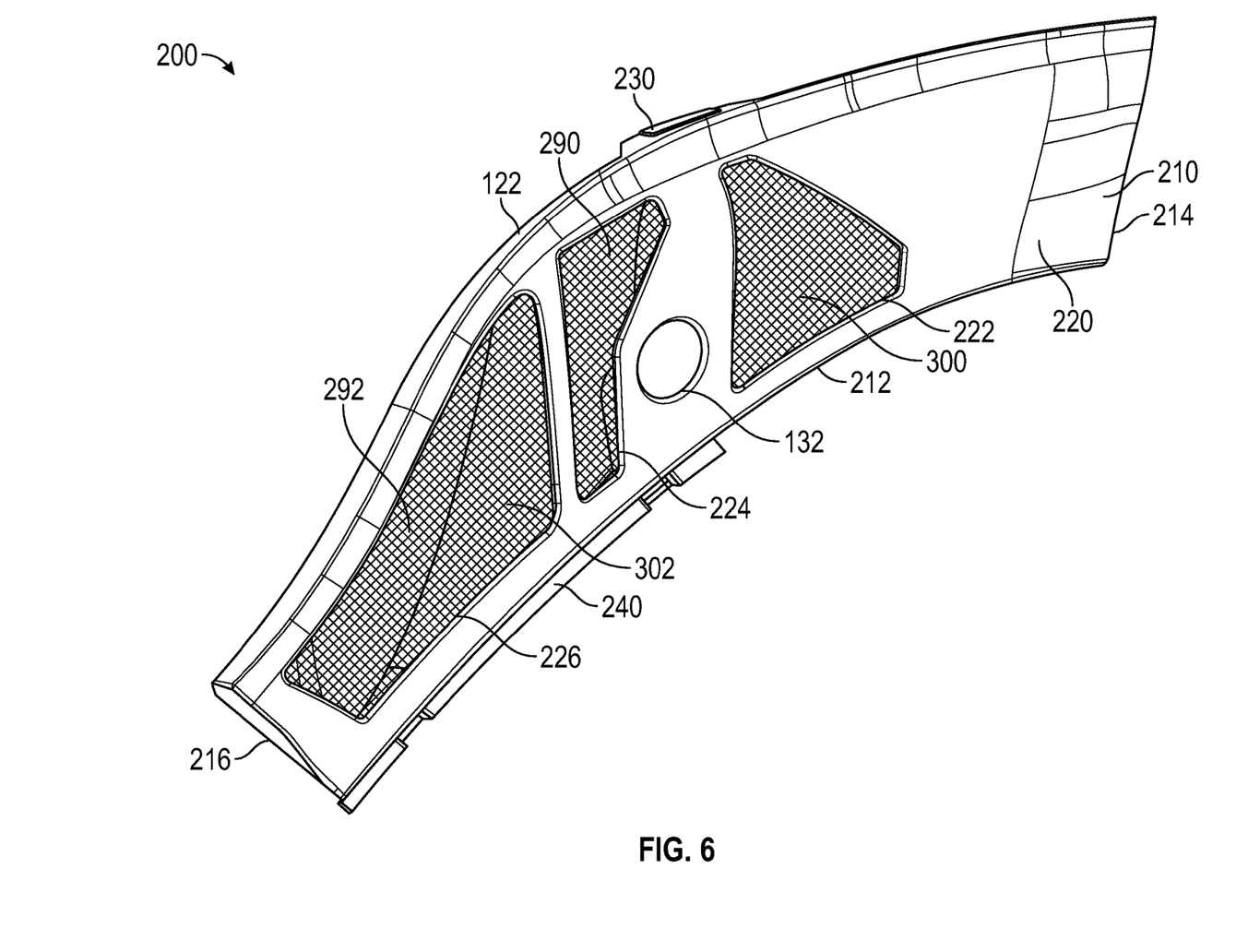
FIG. 6 is a front perspective view of a debris shield of the engine compartment of FIG. 4, according to an exemplary embodiment.
Figure 7:
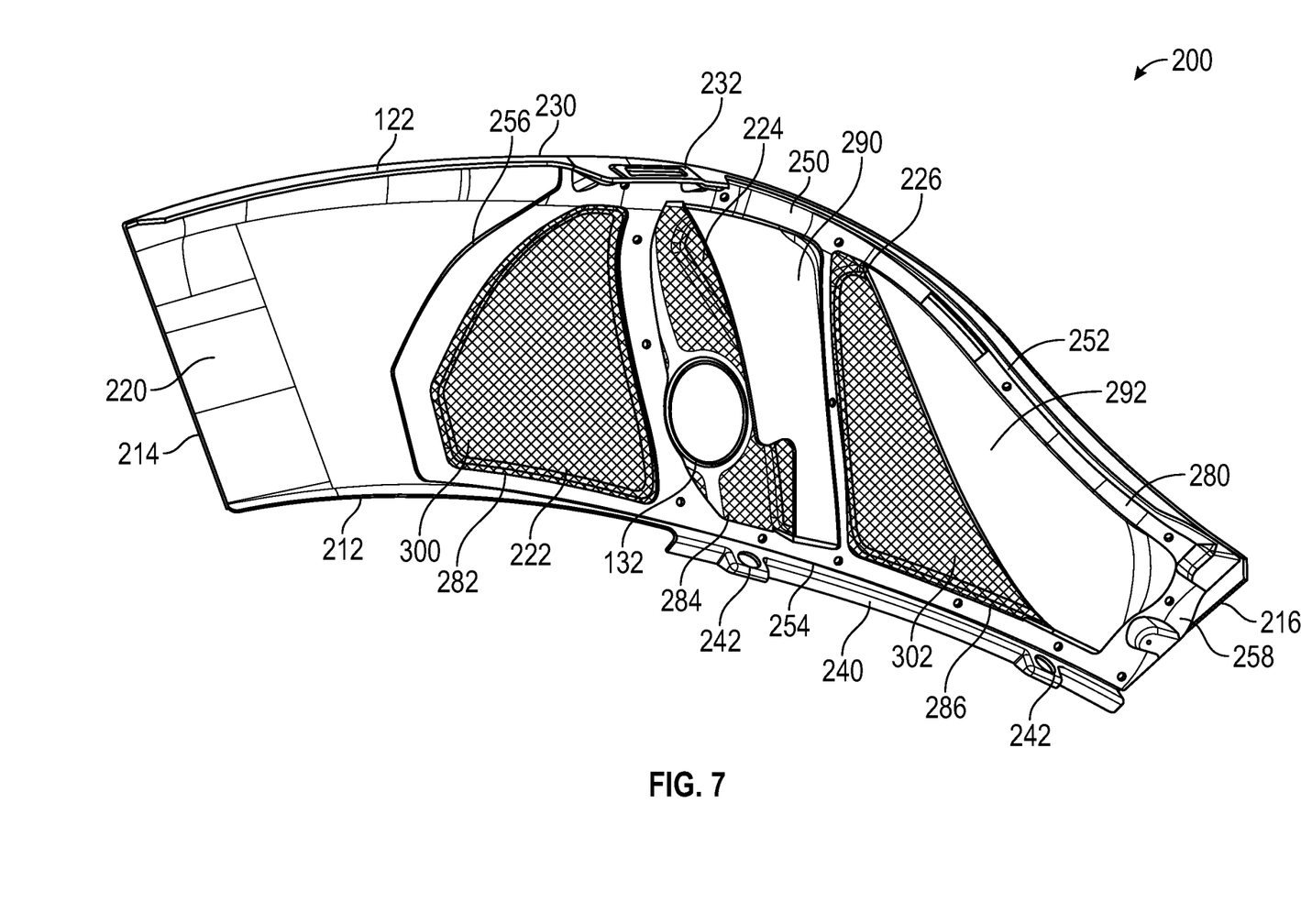
FIG. 7 is a rear perspective view of the debris shield of FIG. 6.
Figure 8:
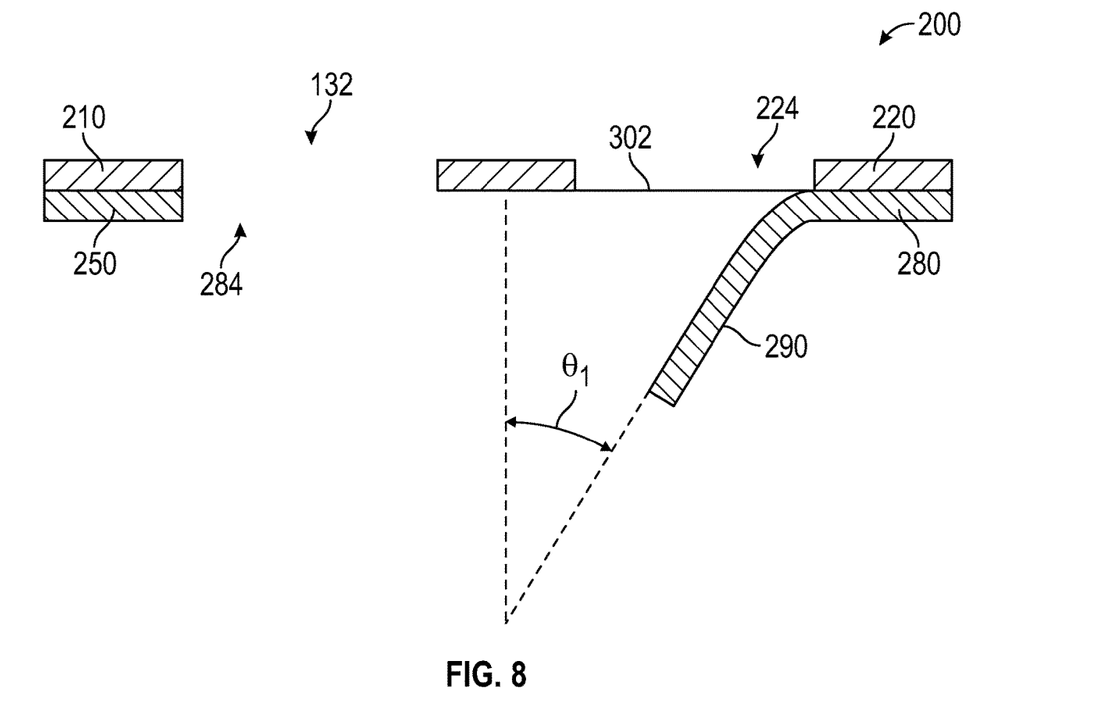
FIGS. 8 and 9 are top section views of the debris shield of FIG. 6.
Figure 9:
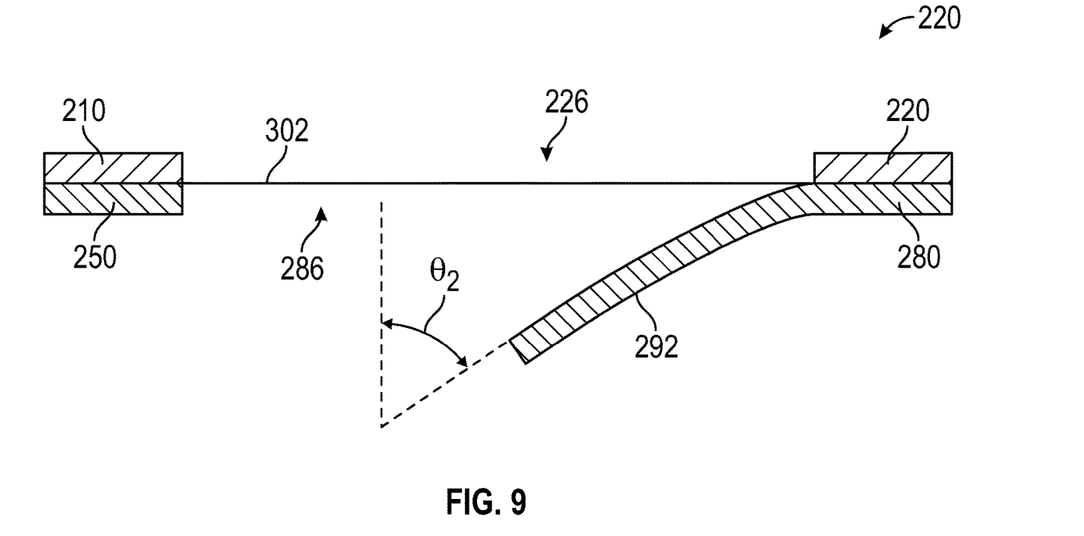

As shown in FIGS. 6 and 7, the debris shield 200 is a sandwiched assembly including a first layer, base layer, outer layer, frame, plate, or component, shown as outer frame 210. The outer frame 210 may be exposed on the exterior of the vehicle 10 (e.g., visually exposed, exposed to the environment, etc.). The outer frame 210 may be the outermost component of the outer frame 210. The outer frame 210 may act as a structure of the debris shield 200. The outer frame 210 may be made of plastic, fiberglass, or another material.

The outer frame 210 includes an upper edge 122. Opposite the upper edge 122 is a lower edge or boundary, shown as lower edge 212. At a forward end of the outer frame 210 is a frontmost edge or boundary, shown as front edge 214. At a rearward end (e.g., opposite the front edge 214) is a rearmost edge or boundary, shown as rear edge 216. The upper edge 122 has a convex curvature. The lower edge 212 has a concave curvature. The front edge 214 and the rear edge 216 may be substantially straight. Together, the upper edge 122, the front edge 214, the lower edge 212, and the rear edge 216 form a continuous perimeter of the outer frame 210.

The outer frame 210 includes a flat portion, shown as base portion 220. The base portion 220 defines three apertures or passages, shown as ventilation aperture 222, ventilation aperture 224, and ventilation aperture 226, that define each define part of one of the ventilation apertures 130. The ventilation apertures 222, 224, and 226 extend through the entirety of the base portion 220. The ventilation apertures 222, 224, and 226 are positioned (a) between the upper edge 122 and the lower edge 212 and (b) between the front edge 214 and the rear edge 216. The ventilation apertures 222, 224, and 226 are arranged in line with one another along the upper edge 122 and the lower edge 212. The ventilation aperture 224 is positioned between the ventilation aperture 222 and the ventilation aperture 226.

The base portion 220 further defines a pass-through aperture 132. The pass-through aperture 132 passes through the entirety of the base portion 220. The pass-through aperture 132 is positioned between the ventilation aperture 222 and the ventilation aperture 224.

The outer frame 210 further includes a first flange or protrusion, shown as bottom flange 230, extending along the lower edge 212. The bottom flange 230 extends inward (e.g., toward the center plane of the vehicle 10) from the base portion 220. The bottom flange 230 defines a pair of apertures or passages, shown as fastener passages 232, extending vertically through the bottom flange 230. Each fastener passage 232 is configured to receive a coupler (e.g., a peg, a clip, a fastener, etc.) from the frame 12 to couple the outer frame 210 to the frame 12.

The outer frame 210 further includes a second flange or protrusion, shown as top flange 240, extending along the upper edge 122. The top flange 240 extends inward (e.g., toward the center plane of the vehicle 10) from the base portion 220. The top flange 240 defines an aperture or passage, shown as fastener passage 242, extending vertically through the top flange 240. The fastener passage 242 is configured to receive a coupler (e.g., a peg, a clip, a fastener, etc.) from the frame 12 to couple the outer frame 210 to the frame 12.

The debris shield 200 further includes a second layer, inner layer, holding layer, plate, or component, shown as inner frame 250. The inner frame 250 may be the innermost portion of the debris shield 200 (e.g., is the closest components to the centerline of the vehicle 10). The inner frame 250 may extend along an inner surface of the outer frame 210. The inner frame 250 may be made of plastic, fiberglass, or another material. The inner frame 250 is coupled to the outer frame 210 (e.g., by fasteners, by adhesive, etc.). In some embodiments, the inner frame 250 is received between the base portion 220 and the bottom flange 230 of the outer frame 210. In some embodiments, the inner frame 250 is received between the base portion 220 and the top flange 240 of the outer frame 210.

The inner frame 250 includes an uppermost edge or boundary, shown as upper edge 252. The upper edge 252 extends along the upper edge 122. Opposite the upper edge 252 is a lowermost edge or boundary, shown as lower edge 254. The lower edge 254 extends along the lower edge 212. At a forward end of the inner frame 250 is a frontmost edge or boundary, shown as front edge 256. At a rearward end (e.g., opposite the front edge 256) is a rearmost edge or boundary, shown as rear edge 258. The rear edge 258 extends along the rear edge 216. Together, the upper edge 252, the front edge 256, the lower edge 254, and the rear edge 258 form a continuous perimeter of the inner frame 250.

The inner frame 250 includes a flat portion, shown as base portion 280. The base portion 280 defines three apertures or passages, shown as ventilation aperture 282, ventilation aperture 284, and ventilation aperture 286, that define each define part of one of the ventilation apertures 130. The ventilation apertures 282, 284, and 286 align with the ventilation apertures 222, 224, and 226 of the outer frame 210, respectively. The ventilation apertures 282 and 286 have similar shapes as and are slightly larger than the ventilation apertures 222 and 226 of the outer frame 210, respectively. The ventilation apertures 282 and 286 overlap the ventilation apertures 222 and 226 of the outer frame 210, respectively. The ventilation aperture 284 overlaps both the ventilation aperture 224 and the pass-through aperture 132 of the outer frame 210. The ventilation apertures 282, 284, and 286 are positioned (a) between the upper edge 252 and the lower edge 254 and (b) between the front edge 256 and the rear edge 258. The ventilation apertures 282, 284, and 286 are arranged in line with one another along the upper edge 252 and the lower edge 254. The ventilation aperture 284 is positioned between the ventilation aperture 282 and the ventilation aperture 286.

Referring to FIGS. 6-9, the inner frame 250 further includes a pair of baffles, flow guides, or flow diverters, shown as baffle 290 and baffle 292. The baffles 290 and 292 guide airflow through the ventilation apertures 130. The baffle 290 extends inward from the base portion 280 and partially across the ventilation aperture 284. Specifically, the baffle 290 is oriented at an angle $\Theta_1$ relative to the path of the ventilation aperture 284 (e.g., relative to an axis that is perpendicular to the plane of the inner frame 250). The baffle 292 extends inward from the base portion 280 and partially across the ventilation aperture 286. Specifically, the baffle 292 is oriented at an angle $\Theta_2$ relative to the path of the ventilation aperture 286 (e.g., relative to an axis that is perpendicular to the plane of the inner frame 250). In some embodiments, the angle $\Theta_1$ is smaller than the angle $\Theta_2$, such that baffle 290 is angled more steeply relative to the plane of the inner frame 250 than the baffle 292. The angle $\Theta_1$ and the angle $\Theta_2$ may be between 0 and 90 degrees (e.g., between 10 and 80 degrees, between 30 and 60 degrees, etc.)

The debris shield 200 further includes one or more pieces of mesh, pieces of webbing, screens, or filters, shown as screen 300 and screen 302. The screen 300 and the screen 302 may be made from a perforated material. The perforated material may include a series of holes that are large enough to permit the passage of air and other gases therethrough but small enough to prevent the passage of debris therethrough. The screen 300 and the screen 302 may be made from plastic, metal, or another material.

The screen 300 and the screen 302 are positioned between the outer frame 210 and the inner frame 250. The outer frame 210 and the inner frame 250 apply a clamping force on the screen 300 and the screen 302, holding the screens 300 and 302 in place relative to the outer frame 210. By way of example, the inner frame 250 may be coupled to outer frame 210 with a series of fasteners such that when the fasteners are tightened, the inner frame 250 is forced toward the outer frame 210 to produce the clamping force.

The screen 300 extends across the ventilation aperture 222 and the ventilation aperture 282. Accordingly, the screen 300 permits airflow to pass through the ventilation aperture 222 while preventing debris from entering the engine compartment 110 through the ventilation aperture 222. The screen 302 extends across the ventilation aperture 224, the ventilation aperture 226, and the ventilation aperture 286 and partially across the ventilation aperture 284. Accordingly the screen 302 permits airflow to pass through the ventilation aperture 224 and the ventilation aperture 226 while preventing debris from entering the engine compartment 110 through the ventilation aperture 224 and the ventilation aperture 226.

In order to permit the conduit 134 to pass through the pass-through aperture 132, it may be advantageous for the pass-through aperture 132 to remain uncovered by the screens 300 and 302. By utilizing two separate screens (e.g., the screen 300 and screen 302), the ventilation apertures 222, 224, and 226 may be covered without covering the pass-through aperture 132. Alternatively, a single screen may be used to cover all of the ventilation apertures 222, 224, and 226, and a portion of the screen may be removed to prevent the screen from covering the pass-through aperture 132.

During operation, the prime mover 52 may generate thermal energy that is desirable to dissipate to the surrounding environment (e.g., to reduce the temperature of the prime mover 52). Air heated by the prime mover 52 may pass out of the engine compartment 110 through the ventilation apertures 130 (e.g., passively, as actively forced by one or more fans). The screens 300 and 302 permit the air to flow freely out of the engine compartment 110 through the ventilation apertures 130.

The baffles 290 and 292 are angled to direct the heated air toward the ventilation apertures 130. By way of example, the baffles 290 and 292 may be angled such that the heated air that would normally pass longitudinally along the inner surface of the debris shield 200 without passing through the ventilation apertures 130 contacts the angled surfaces of the baffles 290 and 292. The angled surfaces direct the heated air laterally outward and through the ventilation apertures 130. Accordingly, the baffles 290 and 292 may facilitate increased airflow out of the engine compartment 110 through the ventilation apertures 130.

During operation, debris may come into contact with the debris shield 200. By way of example, organic material (e.g., leaves, stalks, chaff, etc.) or other debris may be thrown toward the debris shield 200 by an implement of the vehicle 10. Debris that contact the outer frame 210 may be deflected outward by the outer frame 210. Debris that is directed toward the ventilation apertures 130 comes into contact with the screens 300 and 302, such that the screens 300 and 302 prevent the debris from entering the engine compartment 110.

Figure 10:
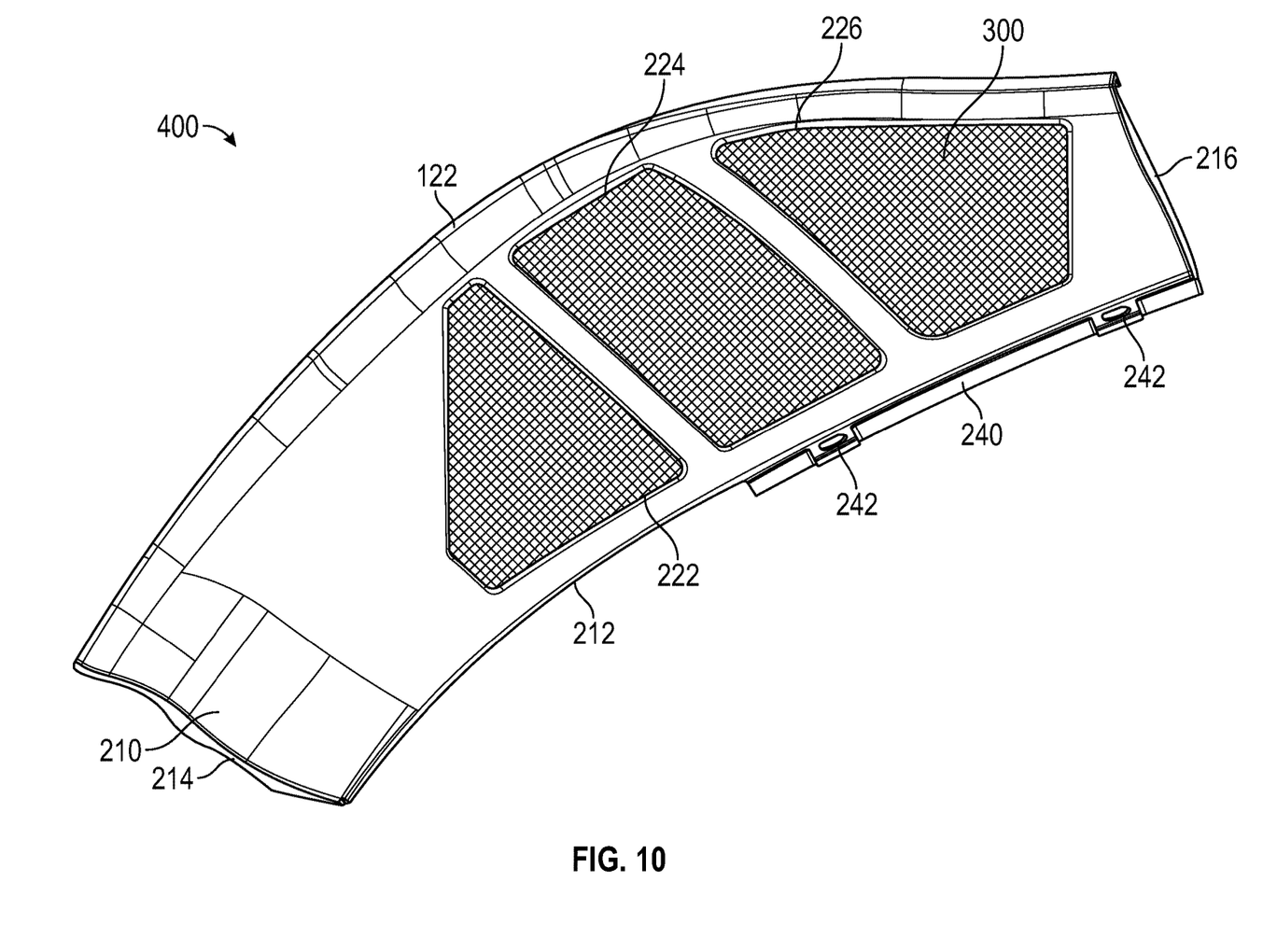
FIG. 10 is a front perspective view of a debris shield of the engine compartment of FIG. 4, according to another exemplary embodiment.
Figure 11:
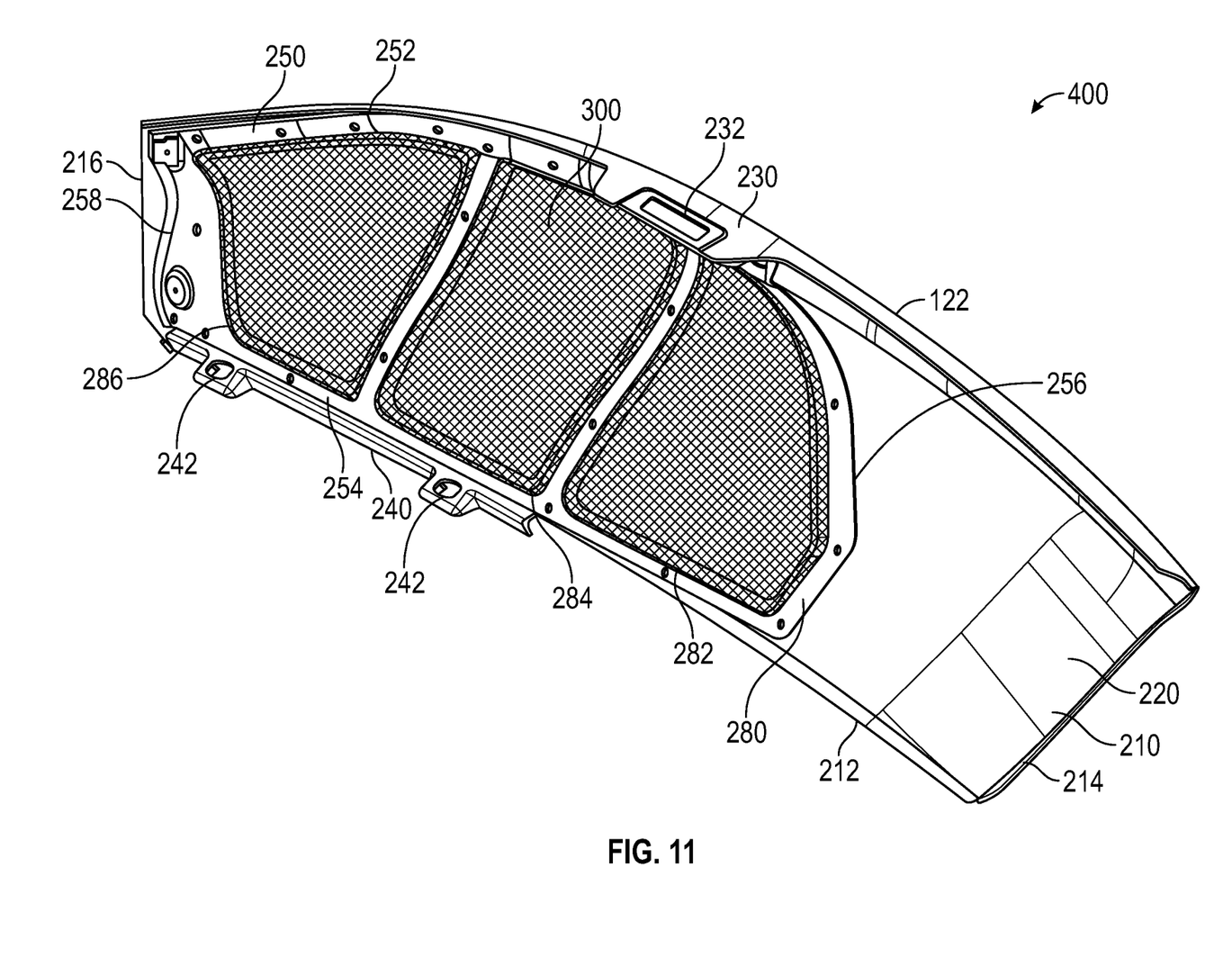
FIG. 11 is a rear perspective view of the debris shield of FIG. 10.

Referring to FIGS. 10 and 11, a debris shield 400 is shown according to an exemplary embodiment. The debris shield 400 is an alternative configuration of the debris shield 120. The debris shield 400 may be substantially similar to the debris shield 200 except as otherwise specified. As shown, the debris shield 400 is configured for use on the left side of the vehicle 10 (e.g., extends along the left side of the engine compartment 110, a road side of the vehicle 10, etc.).

The debris shield 400 omits the pass-through aperture 132. The ventilation apertures 222, 224, and 226 are covered by a single screen 300. The screen 302 is omitted. The inner frame 250 omits the baffle 290 and the baffle 292.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 100, the control system 102, etc.) as shown in the various exemplary embodiments is illustrative only. Additionally, any element disclosed in one embodiment may be incorporated or utilized with any other embodiment disclosed herein.

What is claimed is:

1. A vehicle comprising:
   a frame;
   a tractive element coupled to the frame;
   an engine coupled to the frame and configured to drive the tractive element; and
   a debris shield coupled to the frame and at least partially defining at least one of a left side or a right side of an engine compartment containing the engine, the debris shield including:
   an outer frame coupled to the frame and defining a first ventilation aperture and a second ventilation aperture;
   an inner frame coupled to the outer frame, the inner frame including a baffle extending inward toward the engine and at least partially across the first ventilation aperture, wherein the baffle extends between the first ventilation aperture and the second ventilation aperture; and
   a screen extending across the ventilation aperture,
   wherein the screen extends between the outer frame and the inner frame such that the inner frame limits movement of the screen relative to the outer frame.

2. The vehicle of claim 1, wherein the inner frame surrounds the first ventilation aperture.

3. The vehicle of claim 2, wherein the outer frame defines a pass-through aperture, and wherein a conduit extends through the pass-through aperture from an interior of the engine compartment to an exterior of the vehicle.

4. The vehicle of claim 3, wherein the outer frame further defines a third ventilation aperture, and wherein the pass-through aperture is positioned between the first ventilation aperture and the third ventilation aperture.

5. The vehicle of claim 4, wherein the baffle is a first baffle, and wherein the inner frame further includes a second baffle extending inward toward the engine and at least partially across the second ventilation aperture.

6. The vehicle of claim 5, wherein the screen extends across the first ventilation aperture, the second ventilation aperture, and the third ventilation aperture.

7. The vehicle of claim 1, wherein the outer frame includes a base portion that defines the ventilation aperture and a flange that extends away from the base portion, the flange defining a passage configured to receive a coupler.

8. The vehicle of claim 7, wherein the flange is a first flange, the passage is a first passage, and the coupler is a first coupler, and wherein the outer frame further includes a second flange that extends away from the base portion, the second flange defining a second passage configured to receive a second coupler.

9. The vehicle of claim 8, wherein the first flange extends along an upper edge of the outer frame and the second flange extends along a lower edge of the outer frame.

10. A vehicle comprising:
    a frame;
    a tractive element coupled to the frame;
    an engine coupled to the frame and configured to drive the tractive element;
    a debris shield coupled to the frame and at least partially defining at least one of a left side or a right side of an engine compartment containing the engine, the debris shield including:
    an outer frame coupled to the frame and defining a ventilation aperture;
    an inner frame coupled to the outer frame; and
    a screen extending across the ventilation aperture,
    wherein the screen extends between the outer frame and the inner frame such that the inner frame limits movement of the screen relative to the outer frame; and
    a hood coupled to the frame and at least partially defining the engine compartment, wherein the debris shield extends below the hood.

11. The vehicle of claim 10, wherein the hood is selectively repositionable between a closed position and an open position, and wherein the debris shield remains stationary relative to the frame when the hood is repositioned.

12. The vehicle of claim 11, wherein an upper edge of the debris shield abuts a lower edge of the hood when the hood is in the closed position.

13. The vehicle of claim 12, wherein the debris shield is a first debris shield and at least partially defines the left side of the engine compartment, further comprising a second debris shield coupled to the frame and at least partially defining the right side of the engine compartment.

14. A vehicle comprising:
    a frame;
    a tractive element coupled to the frame;
    an engine coupled to the frame and configured to drive the tractive element; and
    a debris shield coupled to the frame and at least partially defining at least one of a left side or a right side of an engine compartment containing the engine, the debris shield including:
    an outer frame coupled to the frame and defining a first ventilation aperture and a second ventilation aperture;
    an inner frame coupled to the outer frame, the inner frame including a baffle extending between the first ventilation aperture and the second ventilation aperture; and
    a screen coupled to the outer frame and extending across the first ventilation aperture and the second ventilation aperture.

15. The vehicle of claim 14, wherein the inner frame surrounds the first ventilation aperture and the second ventilation aperture.

16. The vehicle of claim 14, wherein the outer frame defines a pass-through aperture, and wherein a conduit extends through the pass-through aperture from an interior of the engine compartment to an exterior of the vehicle.

17. The vehicle of claim 16, wherein the pass-through aperture is positioned between the first ventilation aperture and the second ventilation aperture.

18. A debris shield for an engine compartment of a vehicle, the debris shield comprising:
an outer frame defining:
a first ventilation aperture;
a second ventilation aperture;
a third ventilation aperture, the second ventilation aperture being positioned between the first ventilation aperture and the third ventilation aperture; and
a pass-through aperture configured to receive a conduit therethrough, the pass-through aperture being positioned between the second ventilation aperture and the third ventilation aperture;
an inner frame coupled to the outer frame, the inner frame including:
a first baffle extending between the first ventilation aperture and the second ventilation aperture; and
a second baffle extending away from the outer frame and at least partially across the first ventilation aperture; and
a screen extending across the first ventilation aperture, the screen extending between the outer frame and the inner frame such that the inner frame limits movement of the screen relative to the outer frame,
wherein the inner frame surrounds the first ventilation aperture, the second ventilation aperture, and the third ventilation aperture.

* * * * *